(12) United States Patent
Grespan et al.

(10) Patent No.: US 9,213,451 B2
(45) Date of Patent: Dec. 15, 2015

(54) THIN GLASS FOR TOUCH PANEL SENSORS AND METHODS THEREFOR

(75) Inventors: Silvio Grespan, Shanghai (CN); Casey Feinstein, San Jose, CA (US); Kuo-Hua Sung, Sunnyvale, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1118 days.

(21) Appl. No.: 12/895,815

(22) Filed: Sep. 30, 2010

(65) Prior Publication Data

US 2011/0300908 A1 Dec. 8, 2011

Related U.S. Application Data

(60) Provisional application No. 61/351,835, filed on Jun. 4, 2010.

(51) Int. Cl.
| | |
|---|---|
| *H05K 1/00* | (2006.01) |
| *G06F 3/044* | (2006.01) |
| *C03B 33/09* | (2006.01) |
| *C03C 17/22* | (2006.01) |
| *C03C 21/00* | (2006.01) |

(52) U.S. Cl.
CPC .............. *G06F 3/044* (2013.01); *C03B 33/091* (2013.01); *C03C 17/22* (2013.01); *C03C 21/002* (2013.01); *Y10T 29/49002* (2015.01)

(58) Field of Classification Search
USPC ................... 361/749–750, 803; 174/250–258
See application file for complete search history.

(56) References Cited

U.S. PATENT DOCUMENTS

| | | |
|---|---|---|
| 3,415,637 A | 12/1968 | Glynn |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |
| 3,619,240 A | 11/1971 | Toussaint et al. |
| 3,626,723 A | 12/1971 | Plumat |
| 3,652,244 A | 3/1972 | Plumat |
| 3,753,840 A | 8/1973 | Plumat |
| 3,798,013 A | 3/1974 | Inoue et al. |
| 3,843,472 A | 10/1974 | Toussaint et al. |
| 3,857,689 A | 12/1974 | Koizumi et al. |
| 3,951,707 A | 4/1976 | Kurtz et al. |
| 4,015,045 A | 3/1977 | Rinehart |

(Continued)

FOREIGN PATENT DOCUMENTS

| | | |
|---|---|---|
| AT | 283 630 B | 10/1970 |
| CN | 1277090 A | 12/2000 |

(Continued)

OTHER PUBLICATIONS

Chemically Strengthened Glass, Wikipedia, Apr. 19, 2009, http://en/wikipedia.org/w/index.php?title=Chemically_strengthened_glass&oldid=284794988.

(Continued)

*Primary Examiner* — Tuan T Dinh

(57) ABSTRACT

Improved techniques are disclosed for fabrication of touch panels using thin sheet glass, coupling external circuitry, and securely holding the touch panel within a portable electronic device. The thin sheet glass may be chemically strengthened and laser scribed.

24 Claims, 14 Drawing Sheets

(56) References Cited

U.S. PATENT DOCUMENTS

| | | | |
|---|---|---|---|
| 4,119,760 A | 10/1978 | Rinehart | |
| 4,156,755 A | 5/1979 | Rinehart | |
| 4,165,228 A | 8/1979 | Ebata et al. | |
| 4,178,082 A | 12/1979 | Ganswein et al. | |
| 4,212,919 A | 7/1980 | Hoda | |
| 4,346,601 A | 8/1982 | France | |
| 4,353,649 A | 10/1982 | Kishii | |
| 4,425,810 A | 1/1984 | Simon et al. | |
| 4,646,722 A | 3/1987 | Silverstein et al. | |
| 4,733,973 A | 3/1988 | Machak et al. | |
| 4,842,629 A | 6/1989 | Clemens et al. | |
| 4,844,724 A | 7/1989 | Sakai et al. | |
| 4,846,868 A | 7/1989 | Aratani | |
| 4,849,002 A | 7/1989 | Rapp | |
| 4,872,896 A | 10/1989 | LaCourse et al. | |
| 4,911,743 A | 3/1990 | Bagby | |
| 4,937,129 A | 6/1990 | Yamazaki | |
| 4,957,364 A | 9/1990 | Chesler | |
| 4,959,548 A | 9/1990 | Kupperman et al. | |
| 4,983,197 A | 1/1991 | Froning et al. | |
| 4,986,130 A | 1/1991 | Engelhaupt et al. | |
| 5,041,173 A | 8/1991 | Shikata et al. | |
| 5,104,435 A | 4/1992 | Oikawa et al. | |
| 5,129,934 A | 7/1992 | Koss | |
| 5,157,746 A | 10/1992 | Tobita et al. | |
| 5,160,523 A | 11/1992 | Honkanen et al. | |
| 5,254,149 A | 10/1993 | Hashemi et al. | |
| 5,269,888 A | 12/1993 | Morasca | |
| 5,281,303 A | 1/1994 | Beguin et al. | |
| 5,369,267 A | 11/1994 | Johnson et al. | |
| 5,411,563 A | 5/1995 | Yeh | |
| 5,437,193 A | 8/1995 | Schleitweiler et al. | |
| 5,445,871 A | 8/1995 | Murase et al. | |
| 5,483,261 A | 1/1996 | Yasutake | |
| 5,488,204 A | 1/1996 | Mead et al. | |
| 5,525,138 A | 6/1996 | Hashemi et al. | |
| 5,625,154 A | 4/1997 | Matsuhiro et al. | |
| 5,654,057 A | 8/1997 | Kitayama | |
| 5,725,625 A | 3/1998 | Kitayama et al. | |
| 5,733,622 A | 3/1998 | Starcke et al. | |
| 5,766,493 A | 6/1998 | Shin | |
| 5,780,371 A | 7/1998 | Rifqi et al. | |
| 5,816,225 A | 10/1998 | Koch et al. | |
| 5,825,352 A | 10/1998 | Bisset et al. | |
| 5,826,601 A | 10/1998 | Muraoka et al. | |
| 5,835,079 A | 11/1998 | Shieh | |
| 5,880,411 A | 3/1999 | Gillespie et al. | |
| 5,930,047 A | 7/1999 | Gunz et al. | |
| 5,953,094 A | 9/1999 | Matsuoka et al. | |
| 5,985,014 A | 11/1999 | Ueda et al. | |
| 6,050,870 A | 4/2000 | Suginoya et al. | |
| 6,114,039 A | 9/2000 | Rifqi | |
| 6,120,908 A | 9/2000 | Papanu et al. | |
| 6,166,915 A | 12/2000 | Lake et al. | |
| 6,188,391 B1 | 2/2001 | Seely et al. | |
| 6,232,142 B1* | 5/2001 | Yasukawa | 438/69 |
| 6,245,313 B1 | 6/2001 | Suzuki et al. | |
| 6,307,590 B1 | 10/2001 | Yoshida | |
| 6,310,610 B1 | 10/2001 | Beaton et al. | |
| 6,323,846 B1 | 11/2001 | Westerman et al. | |
| 6,325,704 B1 | 12/2001 | Brown et al. | |
| 6,327,011 B2 | 12/2001 | Kim | |
| 6,350,664 B1 | 2/2002 | Haji et al. | |
| 6,393,180 B1 | 5/2002 | Farries et al. | |
| 6,429,840 B1 | 8/2002 | Sekiguchi | |
| 6,437,867 B2 | 8/2002 | Zeylikovich et al. | |
| 6,516,634 B1 | 2/2003 | Green et al. | |
| 6,521,862 B1 | 2/2003 | Brannon | |
| 6,621,542 B1 | 9/2003 | Aruga | |
| 6,690,387 B2 | 2/2004 | Zimmerman et al. | |
| 6,718,612 B2 | 4/2004 | Bajorek | |
| 6,769,274 B2 | 8/2004 | Cho et al. | |
| 6,810,688 B1 | 11/2004 | Guisit et al. | |
| 6,936,741 B2 | 8/2005 | Munnig et al. | |
| 6,955,971 B2 | 10/2005 | Ghyselen et al. | |
| 6,996,324 B2 | 2/2006 | Hiraka et al. | |
| 7,012,700 B2 | 3/2006 | De Groot et al. | |
| 7,013,709 B2 | 3/2006 | Hajduk et al. | |
| 7,015,894 B2 | 3/2006 | Morohoshi | |
| 7,070,837 B2 | 7/2006 | Ross | |
| 7,166,531 B1 | 1/2007 | van Den Hoek et al. | |
| 7,184,064 B2 | 2/2007 | Zimmerman et al. | |
| 7,461,564 B2 | 12/2008 | Glaesemann | |
| 7,558,054 B1 | 7/2009 | Prest et al. | |
| 7,626,807 B2 | 12/2009 | Hsu | |
| 7,663,607 B2 | 2/2010 | Hotelling et al. | |
| 7,810,355 B2 | 10/2010 | Feinstein et al. | |
| 7,872,644 B2* | 1/2011 | Hong et al. | 345/204 |
| 7,918,019 B2 | 4/2011 | Chang et al. | |
| 8,110,268 B2 | 2/2012 | Hegemier et al. | |
| 8,111,248 B2 | 2/2012 | Lee et al. | |
| 8,312,743 B2 | 11/2012 | Pun et al. | |
| 8,393,175 B2 | 3/2013 | Kohli et al. | |
| 8,551,283 B2 | 10/2013 | Pakula et al. | |
| 8,673,163 B2 | 3/2014 | Zhong | |
| 8,684,613 B2 | 4/2014 | Weber et al. | |
| 2002/0035853 A1 | 3/2002 | Brown et al. | |
| 2002/0155302 A1 | 10/2002 | Smith et al. | |
| 2002/0157199 A1 | 10/2002 | Piltingsrud | |
| 2003/0024274 A1 | 2/2003 | Cho et al. | |
| 2003/0057183 A1 | 3/2003 | Cho et al. | |
| 2003/0234771 A1* | 12/2003 | Mulligan et al. | 345/174 |
| 2004/0051944 A1 | 3/2004 | Stark | |
| 2004/0119701 A1* | 6/2004 | Mulligan et al. | 345/173 |
| 2004/0137828 A1 | 7/2004 | Takahashi et al. | |
| 2004/0142118 A1 | 7/2004 | Takechi | |
| 2004/0163414 A1 | 8/2004 | Eto et al. | |
| 2005/0058423 A1 | 3/2005 | Brinkmann et al. | |
| 2005/0105071 A1 | 5/2005 | Ishii | |
| 2005/0135724 A1 | 6/2005 | Helvajian et al. | |
| 2005/0193772 A1 | 9/2005 | Davidson et al. | |
| 2005/0245165 A1 | 11/2005 | Harada et al. | |
| 2005/0285991 A1 | 12/2005 | Yamazaki | |
| 2006/0026521 A1 | 2/2006 | Hotelling et al. | |
| 2006/0055936 A1 | 3/2006 | Yun et al. | |
| 2006/0063351 A1 | 3/2006 | Jain | |
| 2006/0070694 A1 | 4/2006 | Rehfeld et al. | |
| 2006/0097991 A1 | 5/2006 | Hotelling et al. | |
| 2006/0197753 A1 | 9/2006 | Hotelling et al. | |
| 2006/0227331 A1 | 10/2006 | Wollmer et al. | |
| 2006/0238695 A1 | 10/2006 | Miyamoto | |
| 2006/0250559 A1 | 11/2006 | Bocko et al. | |
| 2006/0268528 A1 | 11/2006 | Zadesky et al. | |
| 2006/0292822 A1 | 12/2006 | Xie | |
| 2007/0003796 A1 | 1/2007 | Isono et al. | |
| 2007/0013822 A1 | 1/2007 | Kawata et al. | |
| 2007/0029519 A1 | 2/2007 | Kikuyama et al. | |
| 2007/0030436 A1 | 2/2007 | Sasabayashi | |
| 2007/0039353 A1 | 2/2007 | Kamiya | |
| 2007/0046200 A1 | 3/2007 | Fu et al. | |
| 2007/0063876 A1 | 3/2007 | Wong | |
| 2007/0089827 A1 | 4/2007 | Funatsu | |
| 2007/0122542 A1 | 5/2007 | Halsey et al. | |
| 2007/0132737 A1* | 6/2007 | Mulligan et al. | 345/173 |
| 2007/0196578 A1 | 8/2007 | Karp et al. | |
| 2007/0236618 A1 | 10/2007 | Maag et al. | |
| 2008/0026260 A1 | 1/2008 | Kawai | |
| 2008/0074028 A1 | 3/2008 | Ozolins et al. | |
| 2008/0094716 A1 | 4/2008 | Ushiro et al. | |
| 2008/0135175 A1 | 6/2008 | Higuchi | |
| 2008/0158181 A1* | 7/2008 | Hamblin et al. | 345/173 |
| 2008/0202167 A1 | 8/2008 | Cavallaro et al. | |
| 2008/0243321 A1 | 10/2008 | Walser et al. | |
| 2008/0261057 A1 | 10/2008 | Slobodin | |
| 2008/0264176 A1 | 10/2008 | Bertrand et al. | |
| 2008/0286548 A1 | 11/2008 | Ellison et al. | |
| 2008/0309633 A1* | 12/2008 | Hotelling et al. | 345/173 |
| 2009/0046240 A1 | 2/2009 | Bolton | |
| 2009/0067141 A1 | 3/2009 | Dabov et al. | |
| 2009/0091551 A1 | 4/2009 | Hotelling et al. | |
| 2009/0096937 A1 | 4/2009 | Bauer et al. | |
| 2009/0153729 A1 | 6/2009 | Hiltunen et al. | |
| 2009/0162703 A1 | 6/2009 | Kawai | |
| 2009/0197048 A1* | 8/2009 | Amin et al. | 428/142 |

(56) References Cited

U.S. PATENT DOCUMENTS

| | | | |
|---|---|---|---|
| 2009/0202808 A1 | 8/2009 | Glaesemann et al. | |
| 2009/0220761 A1 | 9/2009 | Dejneka et al. | |
| 2009/0257189 A1 | 10/2009 | Wang et al. | |
| 2009/0294420 A1 | 12/2009 | Abramov et al. | |
| 2009/0324899 A1 | 12/2009 | Feinstein et al. | |
| 2009/0324939 A1 | 12/2009 | Feinstein et al. | |
| 2009/0325776 A1* | 12/2009 | Murata | 501/66 |
| 2010/0009154 A1 | 1/2010 | Allan et al. | |
| 2010/0028607 A1 | 2/2010 | Lee et al. | |
| 2010/0035038 A1 | 2/2010 | Barefoot et al. | |
| 2010/0053632 A1 | 3/2010 | Alphonse et al. | |
| 2010/0062284 A1 | 3/2010 | Watanabe et al. | |
| 2010/0119846 A1 | 5/2010 | Sawada | |
| 2010/0137031 A1 | 6/2010 | Griffin et al. | |
| 2010/0154992 A1* | 6/2010 | Feinstein et al. | 156/344 |
| 2010/0167059 A1 | 7/2010 | Hashimoto et al. | |
| 2010/0171920 A1 | 7/2010 | Nishiyama | |
| 2010/0179044 A1 | 7/2010 | Sellier et al. | |
| 2010/0206008 A1 | 8/2010 | Harvey et al. | |
| 2010/0215862 A1 | 8/2010 | Gomez et al. | |
| 2010/0216514 A1 | 8/2010 | Smoyer et al. | |
| 2010/0224767 A1 | 9/2010 | Kawano et al. | |
| 2010/0265188 A1* | 10/2010 | Chang et al. | 345/173 |
| 2010/0279067 A1 | 11/2010 | Sabia et al. | |
| 2010/0285275 A1 | 11/2010 | Baca et al. | |
| 2010/0296027 A1 | 11/2010 | Matsuhira et al. | |
| 2010/0315570 A1 | 12/2010 | Mathew et al. | |
| 2010/0321305 A1* | 12/2010 | Chang et al. | 345/173 |
| 2011/0003619 A1 | 1/2011 | Fujii | |
| 2011/0012873 A1 | 1/2011 | Prest et al. | |
| 2011/0019123 A1 | 1/2011 | Prest et al. | |
| 2011/0019354 A1 | 1/2011 | Prest et al. | |
| 2011/0030209 A1 | 2/2011 | Chang et al. | |
| 2011/0063550 A1 | 3/2011 | Gettemy et al. | |
| 2011/0067447 A1 | 3/2011 | Zadesky et al. | |
| 2011/0072856 A1 | 3/2011 | Davidson et al. | |
| 2011/0102346 A1 | 5/2011 | Orsley et al. | |
| 2011/0159321 A1 | 6/2011 | Eda et al. | |
| 2011/0164372 A1 | 7/2011 | McClure et al. | |
| 2011/0186345 A1 | 8/2011 | Pakula et al. | |
| 2011/0199687 A1 | 8/2011 | Sellier et al. | |
| 2011/0248152 A1 | 10/2011 | Svajda et al. | |
| 2011/0255000 A1 | 10/2011 | Weber et al. | |
| 2011/0255250 A1 | 10/2011 | Dinh | |
| 2011/0267833 A1 | 11/2011 | Verrat-Debailleul et al. | |
| 2011/0279383 A1 | 11/2011 | Wilson et al. | |
| 2011/0300908 A1 | 12/2011 | Grespan et al. | |
| 2012/0018323 A1 | 1/2012 | Johnson et al. | |
| 2012/0027399 A1 | 2/2012 | Yeates | |
| 2012/0099113 A1 | 4/2012 | de Boer et al. | |
| 2012/0105400 A1 | 5/2012 | Mathew et al. | |
| 2012/0118628 A1 | 5/2012 | Pakula et al. | |
| 2012/0135195 A1 | 5/2012 | Glaesemann et al. | |
| 2012/0136259 A1 | 5/2012 | Milner et al. | |
| 2012/0151760 A1 | 6/2012 | Steijner | |
| 2012/0188743 A1 | 7/2012 | Wilson et al. | |
| 2012/0196071 A1 | 8/2012 | Cornejo et al. | |
| 2012/0202040 A1 | 8/2012 | Barefoot et al. | |
| 2012/0236477 A1 | 9/2012 | Weber et al. | |
| 2012/0236526 A1 | 9/2012 | Weber et al. | |
| 2012/0281381 A1 | 11/2012 | Sanford | |
| 2012/0328843 A1 | 12/2012 | Cleary et al. | |
| 2013/0071601 A1 | 3/2013 | Bibl et al. | |
| 2013/0083506 A1 | 4/2013 | Wright et al. | |
| 2013/0182259 A1 | 7/2013 | Brezinski et al. | |
| 2014/0176779 A1 | 6/2014 | Weber et al. | |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |
| CN | 101523275 | 2/2009 |
| CN | 101465892 | 6/2009 |
| CN | 102131357 | 7/2011 |
| CN | 1322339 A | 11/2011 |
| DE | 17 71 268 A1 | 12/1971 |
| DE | 32 12 612 A1 | 10/1983 |
| DE | 103 22 350 A1 | 12/2004 |
| EP | 1592073 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2483216 | 8/2012 |
| EP | 2635540 | 9/2013 |
| GB | 1 346 747 | 2/1974 |
| JP | B S42-011599 | 6/1963 |
| JP | B-S48-006925 | 3/1973 |
| JP | 55031944 | 3/1980 |
| JP | 55 067529 | 5/1980 |
| JP | 55-95645 | 7/1980 |
| JP | 55 144450 | 11/1980 |
| JP | 59037451 | 2/1984 |
| JP | A S61-097147 | 5/1986 |
| JP | 6066696 | 10/1986 |
| JP | 63 060129 | 3/1988 |
| JP | 63222234 | 9/1988 |
| JP | 5-32431 | 2/1993 |
| JP | 05249422 | 9/1993 |
| JP | 6242260 A | 9/1994 |
| JP | 52031757 | 3/1997 |
| JP | A H09-507206 | 7/1997 |
| JP | 09-312245 | 12/1997 |
| JP | 2000-163031 | 6/2000 |
| JP | 200203895 A | 7/2000 |
| JP | A 2001-083887 | 3/2001 |
| JP | A 2002-160932 | 6/2002 |
| JP | 2002-342033 | 11/2002 |
| JP | A2003-146705 | 5/2003 |
| JP | A 2004-094256 | 3/2004 |
| JP | A2004-259402 | 9/2004 |
| JP | 2005-162549 | 6/2005 |
| JP | A 2005-156766 | 6/2005 |
| JP | 2007-099557 | 4/2007 |
| JP | 2008-001590 | 1/2008 |
| JP | 2008007360 | 1/2008 |
| JP | 2008-066126 A | 3/2008 |
| JP | A 2008-195602 | 8/2008 |
| JP | A 2008-216938 | 9/2008 |
| JP | A 2008-306149 | 12/2008 |
| JP | A 2009-234856 | 10/2009 |
| JP | 2010 064943 | 3/2010 |
| JP | A 2010-060908 | 3/2010 |
| JP | A 2010-116276 | 5/2010 |
| JP | 2010/195600 | 9/2010 |
| JP | A 2010-237493 | 10/2010 |
| JP | 2011-032124 | 2/2011 |
| JP | A 2011-158799 | 8/2011 |
| JP | 2011-527661 | 11/2011 |
| KR | 2010-2006-005920 | 1/2006 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004-061806 | 7/2004 |
| WO | WO 2004/106253 A | 12/2004 |
| WO | WO 2008/044694 A | 4/2008 |
| WO | WO 2008/143999 A1 | 11/2008 |
| WO | WO 2009/003029 | 12/2008 |
| WO | WO 2009/078406 | 6/2009 |
| WO | WO 2009/099615 | 8/2009 |
| WO | WO 2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/041484 A1 | 4/2011 |

(56) References Cited

FOREIGN PATENT DOCUMENTS

| WO | WO 2012/015960 | 2/2012 |
|---|---|---|
| WO | WO 2012/106280 | 8/2012 |
| WO | WO 2013/106242 A2 | 7/2013 |

OTHER PUBLICATIONS

Wikipedia: "Iphone 4", www.wikipedia.org, retrieved Oct. 31, 2011, 15 pgs.
"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.
Arun K. Varshneya, Chemical Strengthening of Glass: Lessons Learned and Yet to be Learned, International Journal of Applied Glass Science, 2010, 1, 2, pp. 131-142.
Aben "Laboratory of Photoelasticity", Institute of Cybernetics at TTU, www.ioc.ee/res/photo.html, Oct. 5, 2000.
Forooghian et al., Investigative Ophthalmology & Visual Science; Oct. 2008, vol. 49, No. 10.
Saxer et al., "High-Speed Fiber-Based Polarization-sensitive optical coherence tomography of in vivo human skin", Optics Letters, vol. 25, No. 18, Sep. 15, 2000, pp. 1355-1357.
Ohkuma, "Development of a Manufacturing Process of a Thin, Light-weight LCD Cell", Department of Cell Process Development, IBM, Japan, Section 13.4, 2000.
Lee et al., "A Multi-Touch Three Dimensional Touch-Sensitive Tablet", Proceedings of CHI: ACM Conference on Human Factors in Computing Systems, Apr. 1985, pp. 21-25.
Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.
Rubine, "Combining Gestures and Direct Manipulation", CHI'92, May 1992, pp. 659-660.
Westerman, "Hand Tracking, Finger Identification and Chrodic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.
Karlsson et al., "The Technology of Chemical Glass Strengthening—a review", Apr. 2010, Glass Technology, European Journal of Glass Science and Technology A., vol. 51, No. 2, pp. 41-54.

\* cited by examiner

1001

1002

THIN GLASS FOR TOUCH PANEL SENSORS AND METHODS THEREFOR

CROSS-REFERENCE TO RELATED APPLICATION

This application claims priority to U.S. Provisional Patent Application No. 61/351,835, filed Jun. 4, 2010, and entitled "Glass and Module Method and Process", which is hereby incorporated herein by reference.

BACKGROUND OF THE INVENTION

1. Field of the Invention

This relates generally to the fabrication using thin sheets of substrate material, and more particularly, to the fabrication using thin sheet glass.

2. Description of the Related Art

Early computer systems used command-line interfaces, wherein users typed commands to perform specific tasks. While this was well adapted to the use of teletype machines or video display terminals wired to mainframe computers, more user friendly interfaces were desired. Use of a graphical user interface employing a computer mouse as a pointing device overcame many short comings of the command-line interface. However, considerations such as size and inconvenience of the computer mouse become more burdensome as electronic devices become smaller and more portable. Accordingly, the computer mouse may have become less preferred as a way of interacting with some portable electronic devices.

Touch panels have become a preferred way for users to interact with portable electronic devices, such as mobile telephones, digital media players and the like. The iPhone™ and iPod Touch™ manufactured by Apple Inc. of Cupertino, Calif. are popular examples of such portable electronic devices. Such portable electronic devices can include a substantially optically transparent glass touch panel arranged over a display, so that the display is visible through the touch panel.

In general, the thicker the glass, the stronger it is. However, there is strong consumer demand for making portable electronic devices thinner. Accordingly, glass touch panels can be more susceptible to damage, especially during fabrication and processing, if one attempts to make them thinner. Further, space savings are also needed in coupling external circuitry to the touch panel. Additionally, there is a need to hold the touch panel securely within the portable electronic device.

Thus, there is a need for improved techniques for fabrication using thin sheet glass, coupling external circuitry and securely holding the touch panel.

SUMMARY

Improved techniques are disclosed for fabrication of touch panels using thin sheet glass, coupling external circuitry, and securely holding the touch panel. The invention can be implemented in numerous ways, including as a method, system, device and apparatus. Several embodiments of the invention are discussed below.

As an apparatus, one embodiment includes at least a touch sensor panel comprising a chemically strengthened glass substrate having a thickness of substantially less than approximately one half millimeter. The embodiment can also include a first patterned thin film coupled to a first major surface of the glass substrate.

As an apparatus, another embodiment includes at least a thin touch sensor panel comprising a chemically strengthened glass substrate having a thickness of substantially less than approximately one half millimeter, and a first patterned thin film coupled to a first major surface of the glass substrate. This embodiment can also include a portable electronic device incorporating the thin touch sensor panel.

As a method for producing thin touch sensor panels each having a thickness of substantially less than approximately one-half millimeter, one embodiment includes at least the acts of: obtaining a thin mother glass sheet having a thickness of substantially less then approximately one half millimeter; depositing a thin film coupled to a surface of the thin mother glass sheet, and patterning the thin film; laser scribing the thin mother glass sheet; and singulating the thin mother glass sheet into the thin touch sensor panels.

As an apparatus, one embodiment includes at least a flex circuit having a top, bottom and distal extremities; and a touch sensor panel having top and bottom major surfaces, and top and bottom surface coupling sites each comprising substantially uniformly spaced apart conductors. The flex circuit can be folded between the top and bottom extremities for electrically coupling the top and bottom extremities to the top and bottom surface coupling sites.

As method for assembling a portable electronic device having a housing, one embodiment including at least the acts of: coupling a first major surface of a touch sensor panel to a cover glass; coupling the cover glass to the housing; and selectively applying a potting adhesive to a void between the first major surface of the touch sensor panel, the cover glass and the housing in such a way as to avoid applying the potting adhesive to an opposing major surface of the touch sensor panel.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Improved techniques are disclosed for fabrication of touch panels using thin sheet glass. Thin touch sensor panels each having a thickness of substantially less than approximately one-half millimeter can be produced. A thin mother glass sheet having a thickness of substantially less then approximately one half millimeter may be used. The thin mother glass sheet may be chemically strengthened and laser scribed. The thin mother glass sheet may be singulated into the thin touch sensor panels.

Embodiments are discussed below with reference to FIGS. 1-11. However, those skilled in the art will readily appreciate that the detailed description given herein with respect to these figures is for explanatory purposes, as the invention extends beyond these limited embodiments.

Figure 1A:
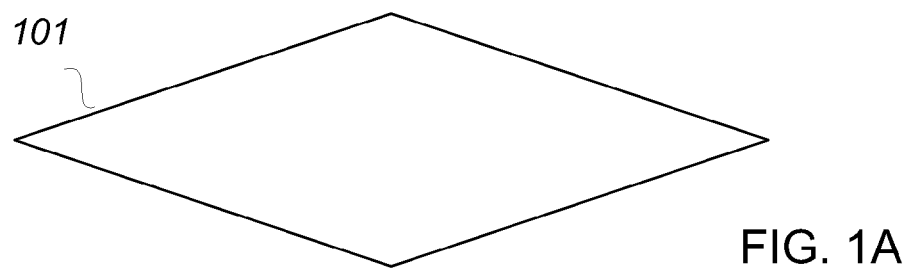
FIGS. 1A-1C show various views of processing thin touch sensor panels.
Figure 1B:
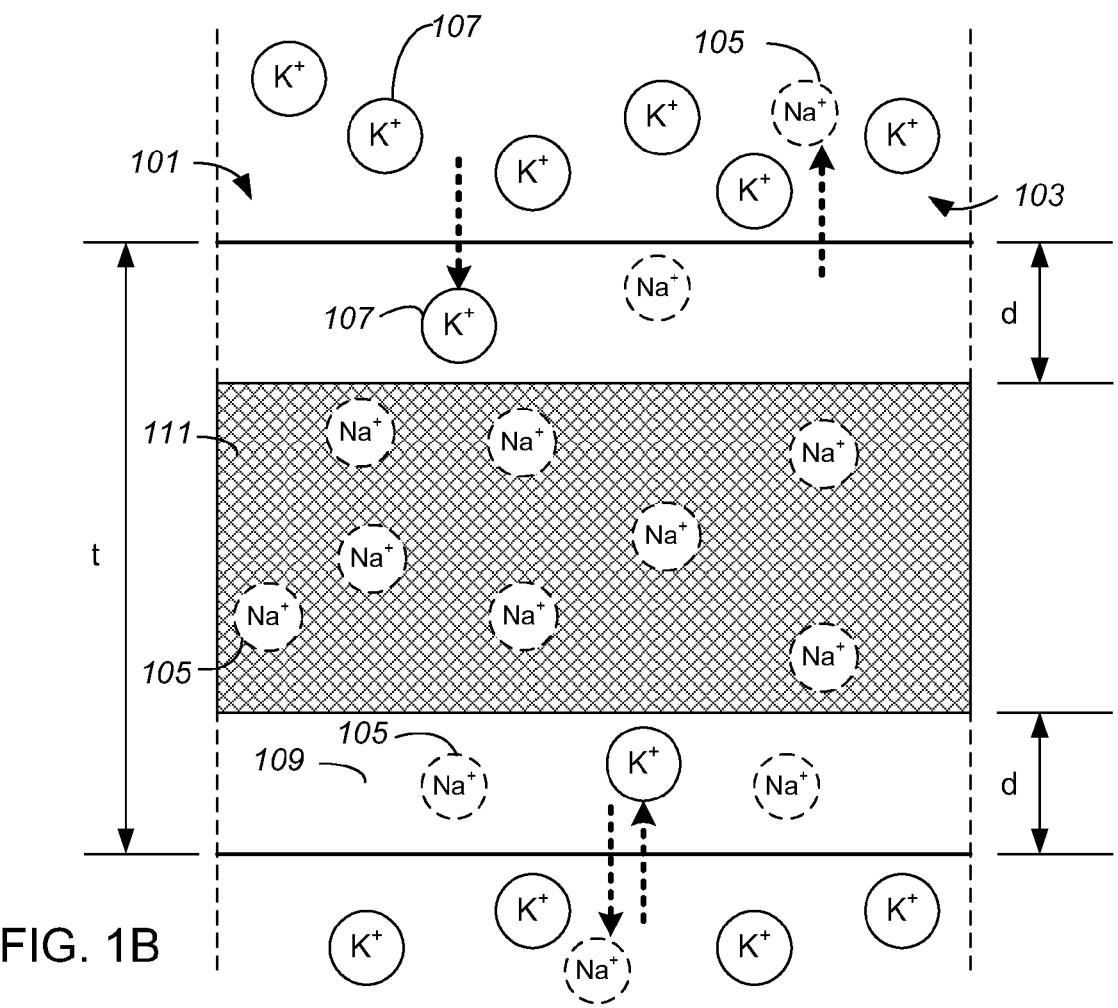
Figure 1C:
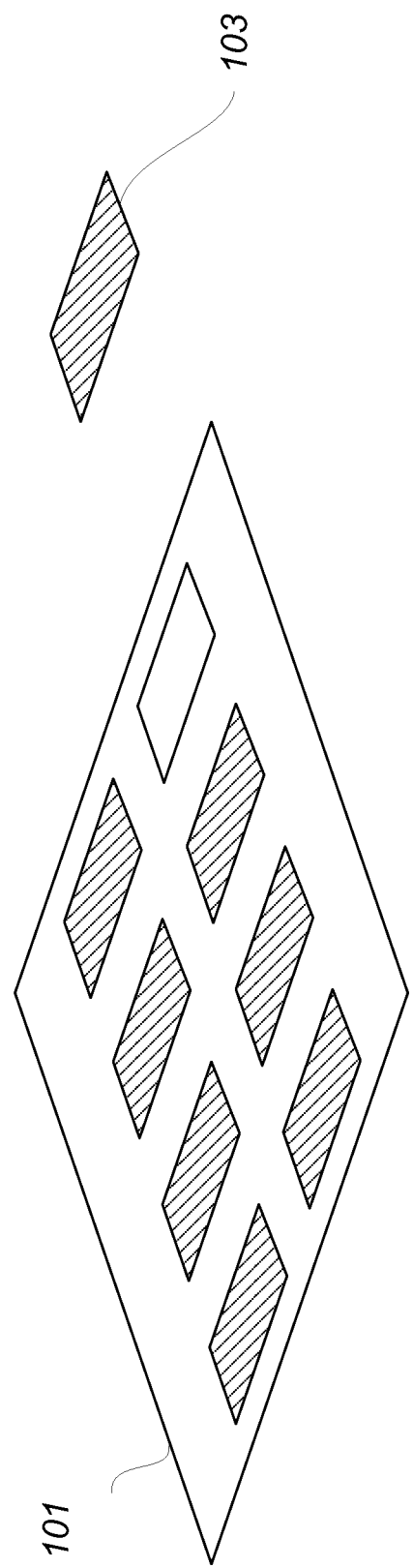

FIGS. 1A-1C show various views of processing the thin mother glass sheet into the thin touch sensor panels. FIG. 1A shows perspective view, and FIG. 1B shows a detailed partial cross sectional view of a thin mother glass sheet 101, which can have a thickness "t" of substantially less than approximately one-half millimeter. The thickness "t" of the thin mother glass sheet 101 may be less than about 0.4 millimeter, may be approximately 0.33 millimeter, or may be approximately 0.3 millimeter.

Size of the thin mother glass sheet 101 can be large, for example dimensions may be approximately two feet by three feet. Substantially optically transparent glass can be used. In particular, soda lime glass or aluminosilicate glass may be used for the thin mother glass sheet 101.

FIG. 1B diagrammatically illustrates a chemical treatment process of submerging the thin mother glass sheet 101 in a heated potassium bath 103 (for example a molten $KNO_3$ bath), for chemically strengthening the thin mother glass sheet 101. When the thin mother glass sheet 101 is submerged or soaked in the heated potassium bath 103, diffusion can occur.

As shown, $Na^+$ ions 105 which are present in thin mother glass sheet 101 can diffuse into potassium bath 103, while $K^+$ ions 107 in potassium bath 103 can diffuse into thin mother glass sheet 101 such that a compressive surface layer 109 can be formed. In other words, $K^+$ ions 107 from potassium bath 103 can be exchanged with $Na^+$ ions 105 to form compressive surface layer 109. The $K^+$ ions 107 can provide a compressive stress surface stress (CS) of the compressive surface layer 109, which chemically strengthens the compressive surface layer 109 of the thin mother glass sheet 101. By controlling chemical treatment parameters such as the length of time of chemical strengthening treatment and/or the concentration of $K^+$ ions 107 in potassium bath 103, a depth (d) of compressive surface layer 109 and compressive stress surface stress (CS) of the compressive surface layer 109 may be substantially controlled.

$K^+$ ions 107 may not diffuse into a center portion 111 of thin mother glass sheet 101. In FIG. 1B the center portion 111 is highlighted with cross hatching. The central portion 111 of the thin mother glass sheet 101 can have a central tension (CT) in response to the compressive stress surface stress (CS) of the compressive surface layer 109. In the thin mother glass sheet 101, central tension (ct) may be substantially linearly related to the initial compressive surface stress (cs). This may be estimated in mathematical relations as $ct=(cs \cdot d)/(t-2d)$, wherein t is the thickness of the thin mother glass sheet 101, and d is the depth of the compressive surface layer. Central tension substantially in excess of a preselected tension value may disadvantageously promote fracturing of the thin mother glass sheet 101.

A thin film can be coupled to one or more surfaced of the thin mother glass sheet, for example by sputtering, and the thin film can be photolithographically patterned. The patterned thin film can comprise a substantially optically transparent and substantially conductive patterned thin film of indium tin oxide (ITO). A respective patterned thin film of each of the thin touch sensor panels can be arranged as substantially conductive electrodes of a respective array of capacitive touch sensors of each of the thin touch sensor panels. Such substantial optical transparency of the thin mother glass sheet and the patterned thin film can provide for substantial optical transparency of each of the thin touch sensor panels, so that a display can be visible through the thin touch sensor panel, if the thin touch sensor panel is arranged over the display in a portable electronic device.

In some embodiments, other materials may be utilized in addition to, or instead of, ITO. These materials may include, without limitation, amorphous silicon, copper indium diselenide, cadmium telluride and film crystalline silicon. Optionally, the thin films may be protected by one or more passivation layers (organic and/or inorganic). Passivation layers may comprise compositions formed over conductive material and other layers which protect those materials from corrosion and other environmental effects. Various types of passivation may be employed. The passivation layers may include, without limitation, passivation layers comprising silicon dioxide and/or silicon nitride.

As shown in FIG. 1C, the thin mother glass sheet 101 can be laser scribed, and broken along the laser scribing to be singulated into the thin touch sensor panels 103 using. For the sake of simplicity, in FIG. 1C two rows of four thin touch sensor panels 103 are shown in with right to left hatching, so that eight thin touch sensor panels are shown as produced from the thin mother glass sheet 101. However, it should be understood that the thin touch sensor panels 103 can be differently arranged. For example, the touch sensor panels can be arranged in five rows of seven thin touch sensor panels, so that thirty five thin touch sensor panels can be produced from the thin mother glass sheet.

Figure 2:
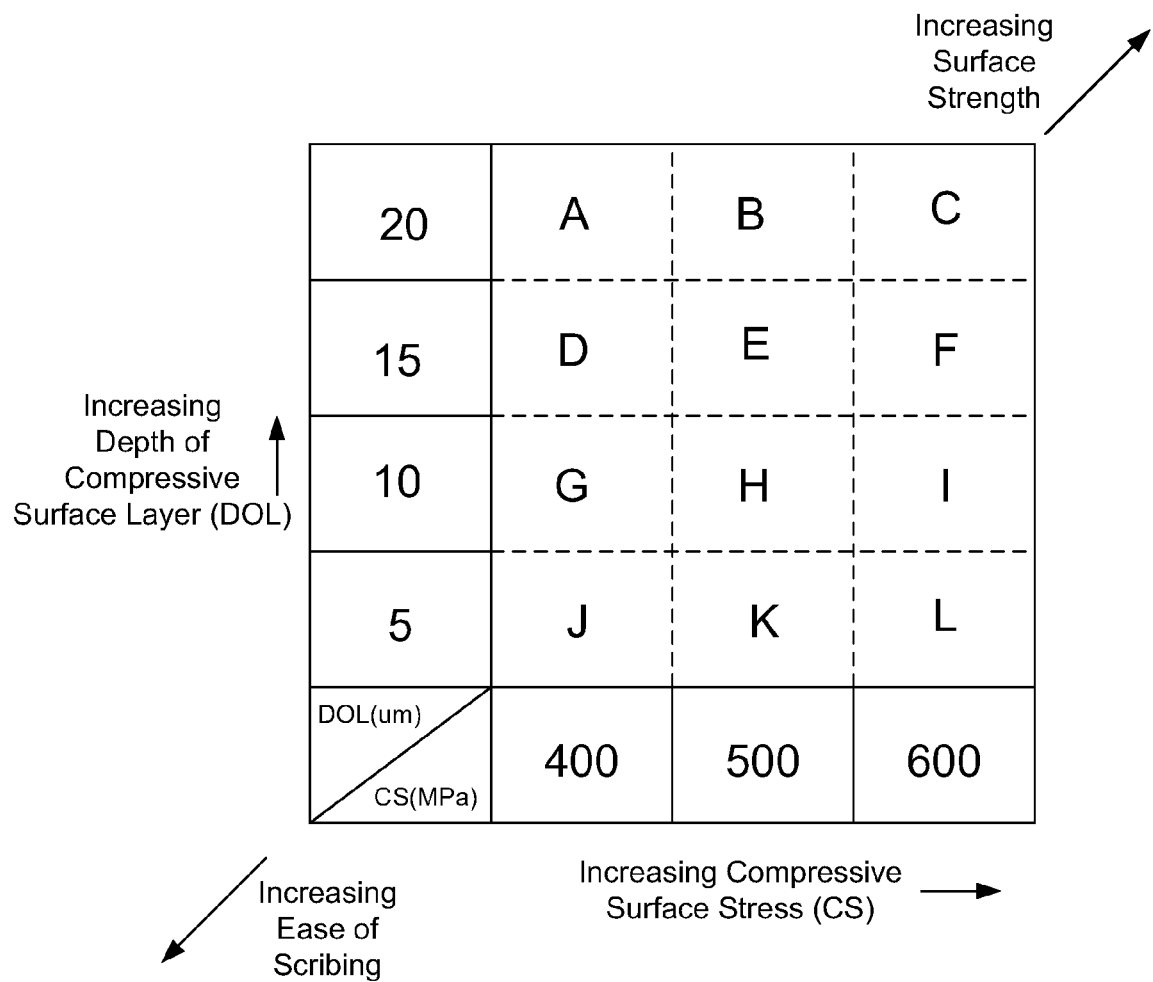
FIG. 2 is a simplified diagram showing various possible configurations for chemically strengthened glass.

FIG. 2 is a simplified diagram showing various possible configurations for chemically strengthened glass, represented by capital letters A-L. Increasing depth of the compressive surface layer of 5 micrometers, 10 micrometers, 15 micrometers and 20 micrometers of the various configurations are arranged vertically. Increasing compressive stress of 400 MegaPascals, 500 MegaPascals, and 600 MegaPascals are arranged horizontally. Configurations closer to the upper right hand corner of FIG. 2 can have greater surface strength relative to configurations closer to the lower left hand corner of FIG. 2. Conversely, configurations closer to the lower left hand corner of FIG. 2 can have greater ease of laser scribing relative to configurations closer to the upper right hand corner of FIG. 2. More central configurations shown in FIG. 2 may have some degree of balance between ease of laser scribing and surface strength.

In light of the forgoing, surface strength and ease of laser scribing may be understood as competing interests, which may be balanced by selective control of chemical treatment parameters. This in turn may selectively produce balanced configurations of depth of compressive surface layer and compressive surface stress in the thin mother glass sheet. The chemically strengthened thin mother glass sheet can have sufficiently high compressive surface stress and depth of compressive layer, so as to provide for substantial strengthening of the thin mother glass sheet, while at the same time the chemically strengthened thin mother glass sheet can have sufficiently low compressive surface stress and depth of compressive layer, so as to provide for substantial laser scribing of the thin mother glass sheet.

For example, chemical treatment parameters may be suitably controlled by submerging a 0.33 millimeter thin soda lime mother glass sheet in substantially 100% $KNO_3$ at approximately 450 degrees centigrade for approximately eighty minutes, to balance competing interests of surface strength and ease of laser scribing. Using the foregoing chemical treatment parameters, The chemically strengthened thin mother glass sheet can have sufficiently high compressive surface stress and depth of compressive layer, so as to provide for substantial strengthening of the thin mother glass sheet, while at the same time the chemically strengthened thin mother glass sheet can have sufficiently low compressive surface stress and depth of compressive of compressive layer, so as to provide for substantial laser scribing of the thin mother glass sheet.

Figure 3:
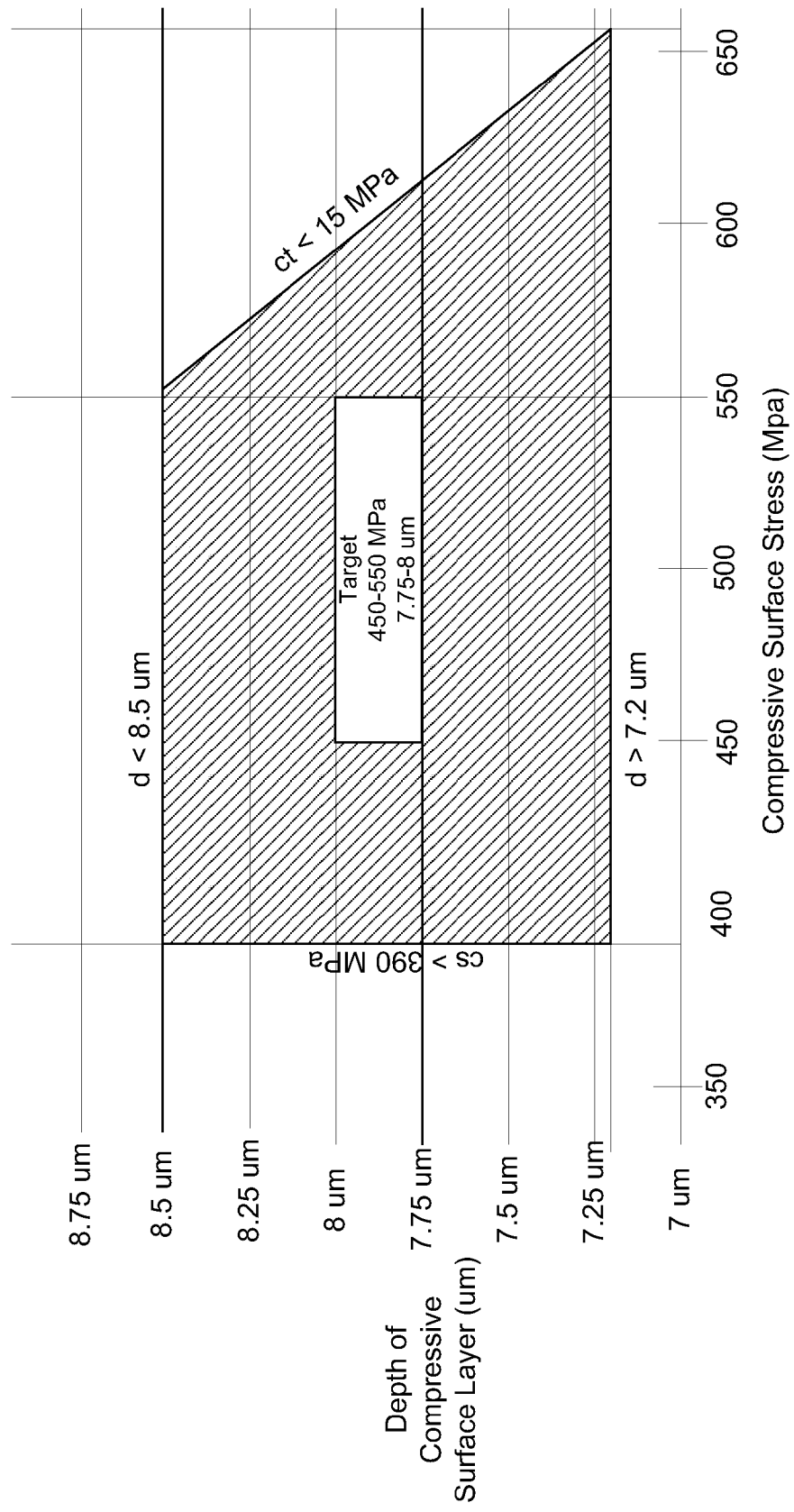
FIG. 3 is a diagram showing depth of compressive surface layer versus compressive surface stress for a chemically strengthened thin mother glass sheet, which is to be processed into thin touch sensor panels.

FIG. 3 is a diagram showing depth of compressive surface layer versus compressive surface stress for the chemically strengthened thin mother glass sheet, which is to be processed into thin touch sensor panels. Hatching in FIG. 3 highlights a continuum of intersecting ranges for central tension, compressive surface stress and compressive surface layer depth for the 0.33 millimeter thin soda lime mother glass sheet.

The thin mother glass sheet may be chemically strengthened for a sufficient period of time (for example for approximately eighty minutes in substantially 100% $KNO_3$ at approximately 450 degrees), so that: the compressive surface layer depth of the thin mother glass sheet is substantially greater than a low preselected compressive surface layer depth value; and the compressive surface layer depth of the thin mother glass sheet is substantially less than a high preselected compressive surface layer depth value.

For example, as shown in FIG. 3, the thin mother glass sheet may be chemically strengthened for a sufficient period of time, so that: the compressive surface layer depth (d) of the thin mother glass sheet is substantially greater than a low preselected compressive surface layer depth value of approximately 7.2 micrometers; and the compressive surface layer depth (d) of the thin mother glass sheet is substantially less than a high preselected compressive surface layer depth value of approximately 8.2 micrometers. This is illustrated in the diagram of FIG. 3 with a horizontal legends d>7.2 micrometers and d<8.5 micrometers, which are disposed along vertical extents of the continuum.

The thin mother glass sheet may be chemically strengthened for a sufficient period of time, so that: the compressive surface stress (cs) of the thin mother glass sheet is substantially greater than a low preselected compressive surface stress value of approximately three hundred ninety MegaPascals; and the compressive surface stress (cs) of the thin mother glass sheet is substantially less than a high preselected compressive surface stress value of approximately five hundred-and-fifty MegaPascals (MPa). This is illustrated in the diagram of FIG. 3 with vertical legend cs>390 MPa, disposed along a horizontal extent of the continuum, and with a vertical line disposed at five hundred-and-fifty MegaPascals. For ease of processing and uniformity: a target for compressive surface stress of the thin mother glass sheet may be substantially within a range from approximately four hundred-and-fifty MegaPascals to approximately five hundred-and-fifty MegaPascals; and a target for depth of compressive layer may be substantially within a range from approximately 7.75 micrometers to approximately 8 micrometers.

Employing a preselected high tension value, for example, of approximately fifteen MegaPascals, the central tension (ct) of the thin mother glass sheet may be substantially less than the preselected high tension value. Central tension substantially in excess of the preselected tension value may disadvantageously promote fracturing of the thin mother glass sheet. As mentioned previously herein, in the thin mother glass sheet, central tension (ct) may be linearly related to the compressive surface stress (cs). The foregoing is illustrated in the diagram of FIG. 3 with a legend ct<15 MPa, which is disposed along an angled extent of the continuum.

Figure 4:
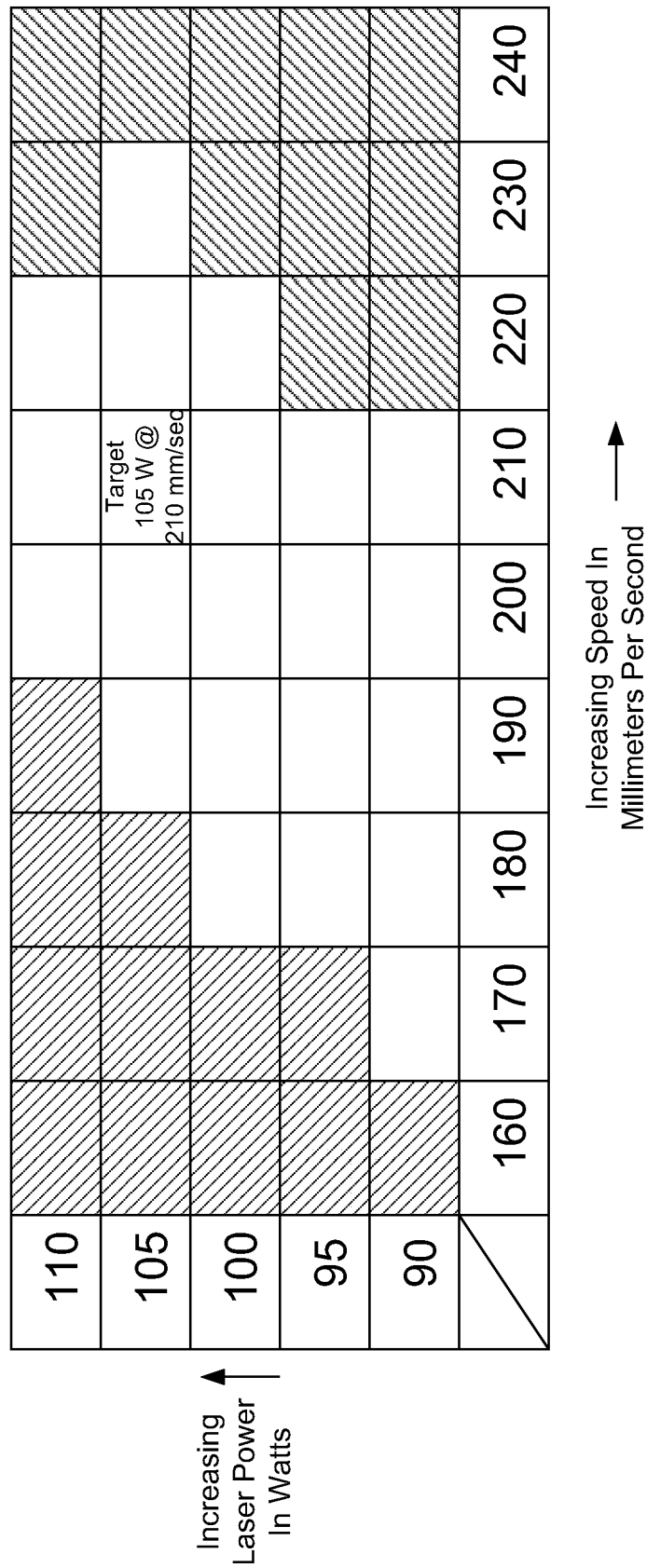
FIG. 4 is a diagram showing various laser scribing configurations of laser power versus speed, for laser scribing the thin touch sensor panels of the thin mother glass sheet.

FIG. 4 is a diagram showing various scribing configurations of laser power versus speed, for laser scribing the thin touch sensor panels of the thin mother glass sheet. With respect to the following discussion, the 0.33 millimeter thin soda lime mother glass sheet being laser scribed was chemically strengthened for approximately eighty minutes in substantially 100% $KNO_3$ at approximately 450 degrees.

In FIG. 4 increasing laser power of 90 Watts, 95 Watts, 100 Watts, 105 Watts and 110 Watts of the various configurations are arranged vertically. Increasing laser scribing speed of 160 millimeters per second to 240 millimeters per second are arranged horizontally. Laser scribing configurations of relatively higher laser power and relatively lower scribing speed that are closer to the upper left hand corner of FIG. 4 and highlighted with right to left hatching may have undesirable saw through of the thin mother glass sheet. Saw through may create difficulties in handling and processing the thin mother glass sheet. Accordingly, scribing may be preferred that does not saw through the thin mother glass sheet.

Laser scribing configurations of relatively lower laser power and relatively higher scribing speed that are closer to the lower right hand corner of FIG. 4 and highlighted with left to right hatching may not provide for substantial scribing of the thin mother glass sheet.

More central scribing configurations of laser power and scribing speed (shown in FIG. 4 without any hatching) can provide substantial scribing without saw through. As shown in FIG. 4 laser scribing can be done at a rate that is sufficiently low and at a power level that is sufficiently high for substantially scribing the thin mother glass sheet, while the rate is also sufficiently high and the power level is sufficiently low for avoiding sawing entirely through the thin mother glass sheet. For ease of processing and uniformity: a target for laser power may be about 105 Watts; and a target for speed of laser scribing may be about 210 millimeters per second.

Figure 5:
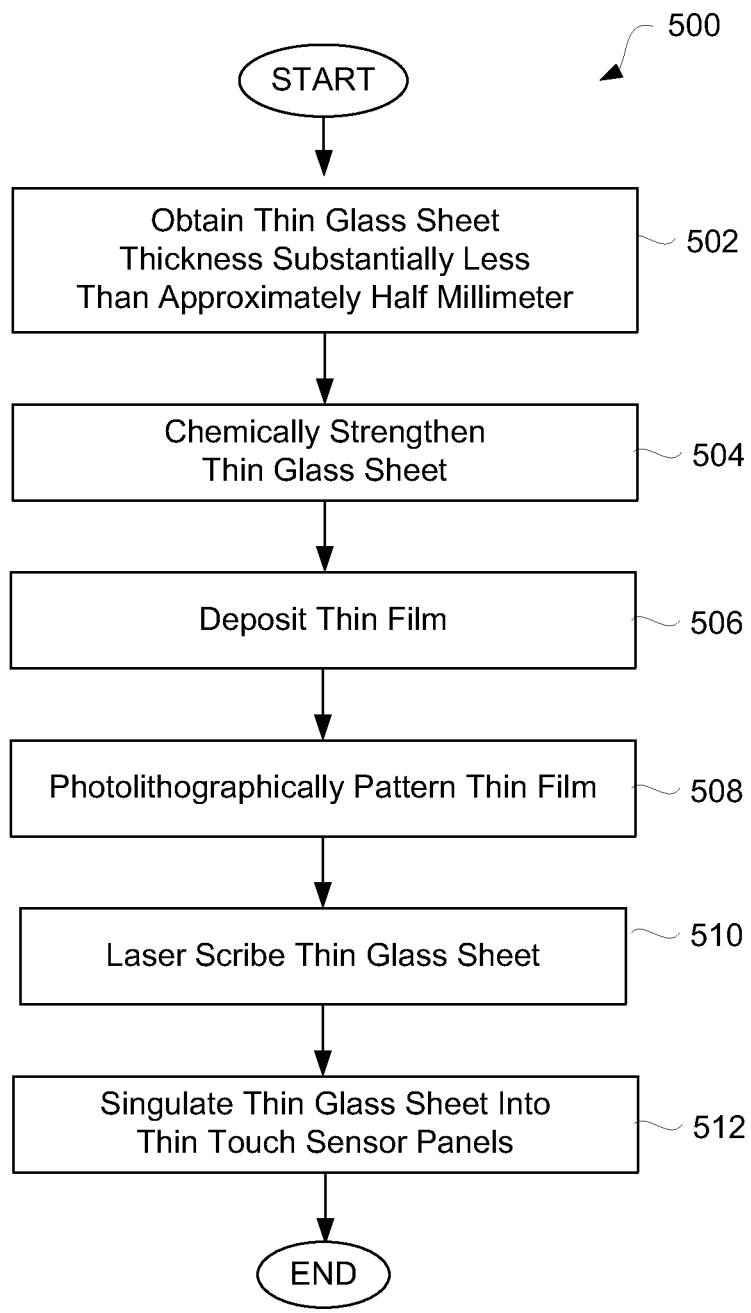
FIG. 5 is a flow chart showing processing of thin touch sensor panels.

FIG. 5 is flow diagram illustrating processing of the thin mother glass sheet into the thin touch sensor panels, each having a thickness of substantially less than approximately one-half millimeter. Such process 500 may begin with obtaining 502 the thin mother glass sheet having the thickness of substantially less than approximately one half millimeter. The process 500 may continue with chemically strengthening 504 the thin mother glass sheet. The process 500 may continue with depositing 506 a thin film coupled to a surface of the thin mother glass sheet, and photolithographically patterning 508 the thin film.

The process 500 may continue with laser scribing 508 the thin mother glass sheet, at a desired rate and laser power level so as to substantially scribe the thin mother glass sheet, while avoiding sawing entirely through the thin mother glass sheet. In operation of the laser scribe, a cooling jet or alcohol or water may follow closely behind motion of the laser, so as to cool the thin mother glass sheet quickly, just after being heated by the laser.

The process 500 may continue and with breaking the thin mother glass sheet along the laser scribing to singulate 512 the thin mother glass sheet into the thin touch sensor panels. Once the thin touch sensor panels have been singulated 512, the process 500 can end.

Figure 6:
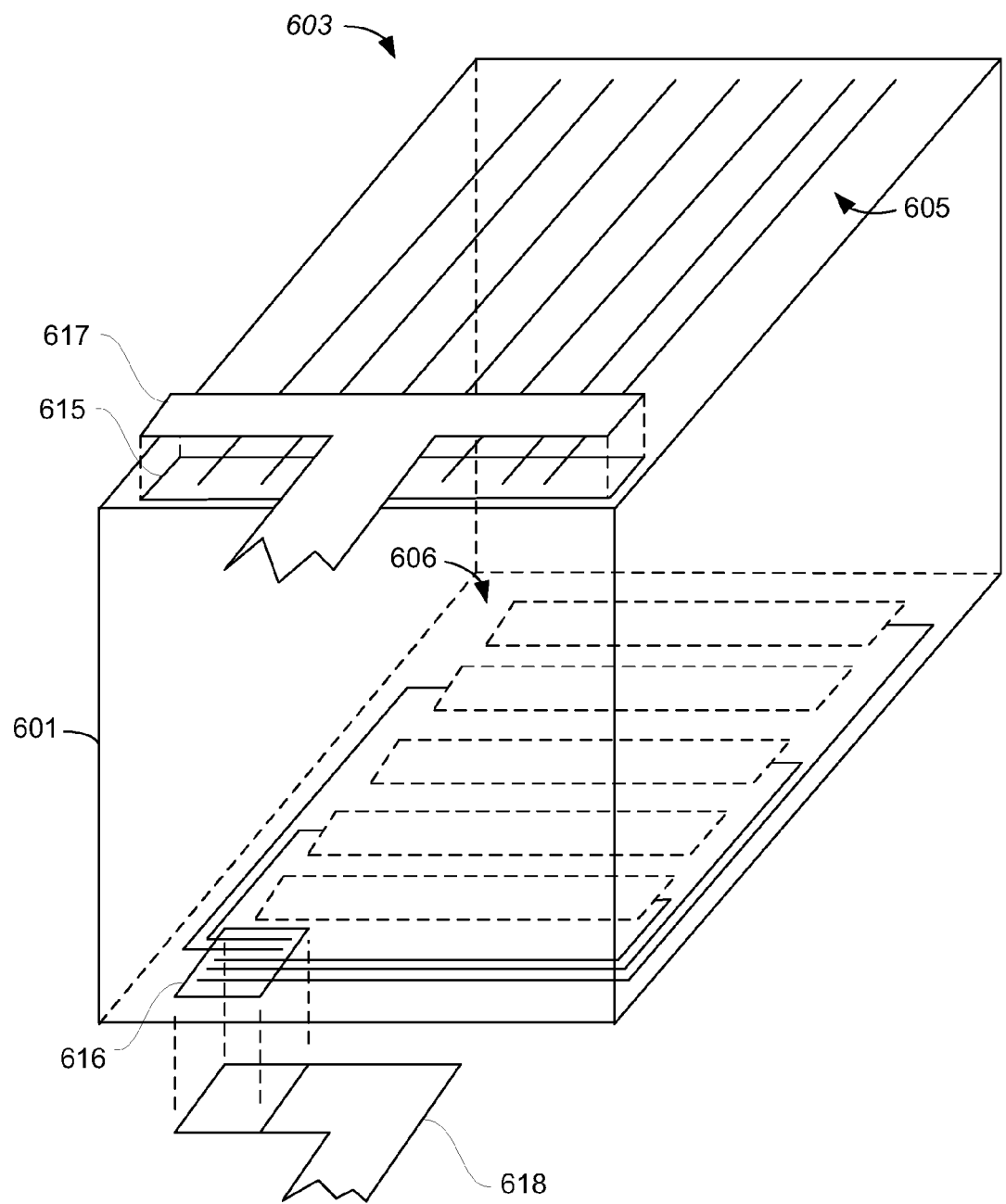
FIG. 6 is a simplified exploded perspective view to illustrate coupling flex circuit to the thin touch sensor panel.

FIG. 6 is a simplified exploded perspective view to illustrate coupling flex circuit to the thin touch sensor panel 603. Thickness of the thin touch sensor panel 603 is shown as greatly exaggerated, for purposes of illustration only. Photolithographically patterned indium tin oxide thin films 605, 606 are coupled to opposing major surfaces of the thin glass substrate 601. As shown in FIG. 6, the patterned thin films 605, 606 on opposing major surfaces of the thin glass substrate 601 may be arranged as opposing electrodes, which may be capacitively coupled through the glass acting as a dielectric, and which may provide a respective array of capacitive touch sensors for each of the thin touch sensor panels.

As will be discussed in greater detail subsequently herein, electrodes may be arranged in a grid pattern of rows and columns on opposing major surfaces of the thin glass substrate 601, so as to provide a two dimensional array of capacitive touch sensors for the thin touch sensor panel 603. For example, as shown in FIG. 6, electrodes 605 of the patterned indium tin oxide thin film may be arranged in columns of sense lines 605 on the thin glass substrate 601, while the opposing electrodes 606 of the patterned indium tin oxide thin film may be arranged in rows of drive lines 606 of the thin glass substrate 603.

As shown in FIG. 6 the thin touch sensor panel 603 can have top and bottom major surfaces, and top and bottom surface coupling sites 615, 616, which both may be arranged on the opposing surfaces but overlapping near the same end portion of the thin touch sensor panel 603. Anisotropic conductive film may be used for conductively bonding flex circuit extremities 617, 618 to the top and bottom surface coupling sites 615, 616. Such bonding arrangement can help minimize the size of thin touch sensor panel 603, because no extra area is needed for non-overlapping bonding areas, and the area reserved for attachments can be minimized.

Column electrodes 605 of the patterned indium tin oxide thin film may be routed to the top surface coupling site 615 of the touch sensor panel 603 using thin metal trace conductors. The metal trace conductors of the top surface coupling site 615 may be substantially uniformly space apart for ease of alignment and conductive bonding to a substantially T shaped extremity 617 of the flex circuit.

Row electrodes 606 of the patterned indium tin oxide thin film may be routed along edges of the bottom major surface of the touch sensor panel to the bottom surface coupling site 616 using thin metal trace conductors. The metal trace conductors of the bottom surface coupling site 616 may be substantially uniformly space apart for ease of alignment and conductive bonding to a non-T shaped extremity 618 of the flex circuit (which may be substantially L shaped 618 as shown in FIG. 6).

The bottom surface coupling site 616 may comprise high density conductors spaced apart by a pitch of substantially less than approximately 100 micrometers. The bottom surface coupling site comprises high density conductors spaced apart by about 60 micrometers. Fiducial marks on the bottom surface coupling site 616 and on the L shaped extremity 618 of the flex circuit may be used to aid in critical alignment with the high density conductors.

Figure 7A:
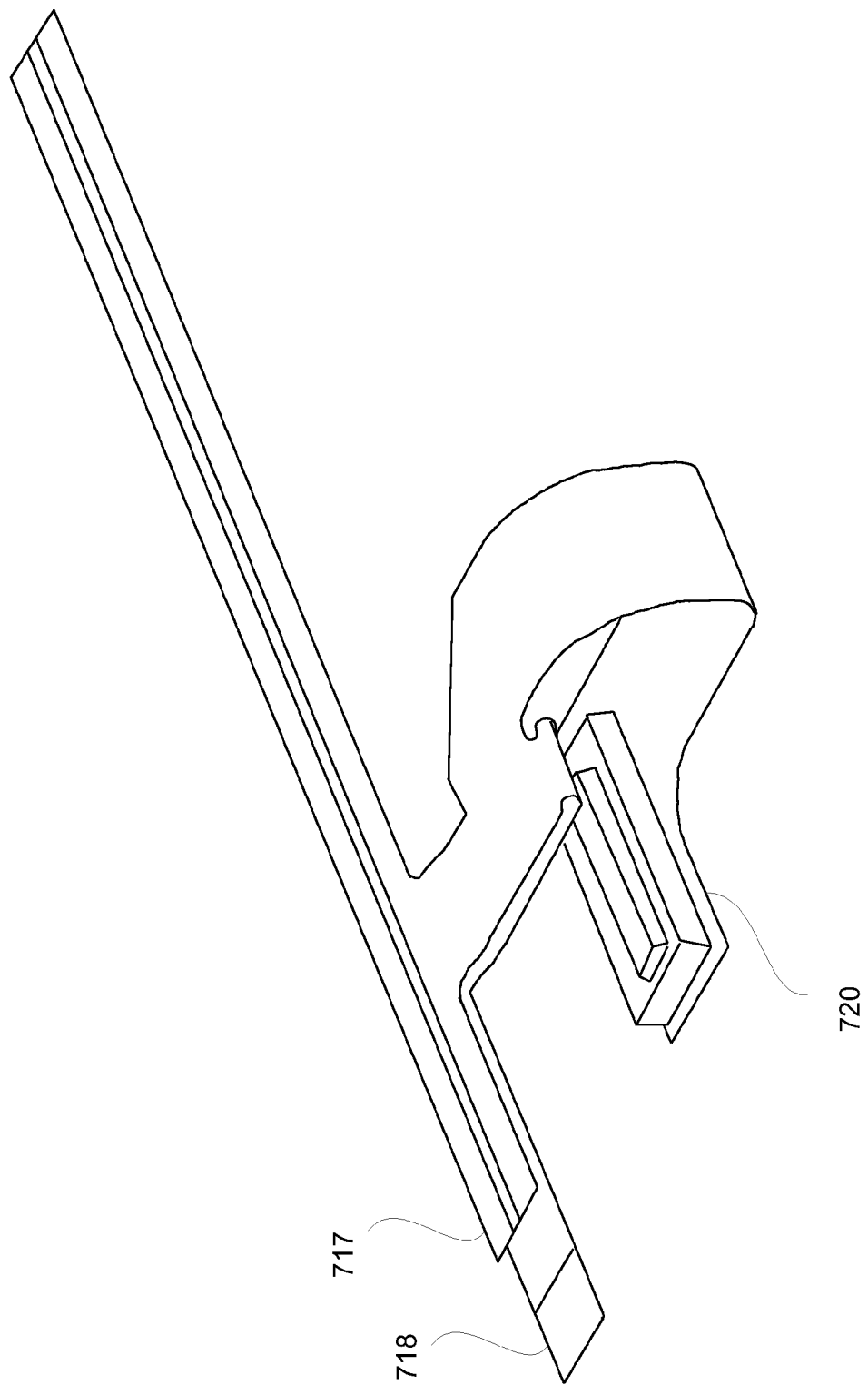
FIGS. 7A-7B are various views of the flex circuit shown in FIG. 6.
Figure 7B:
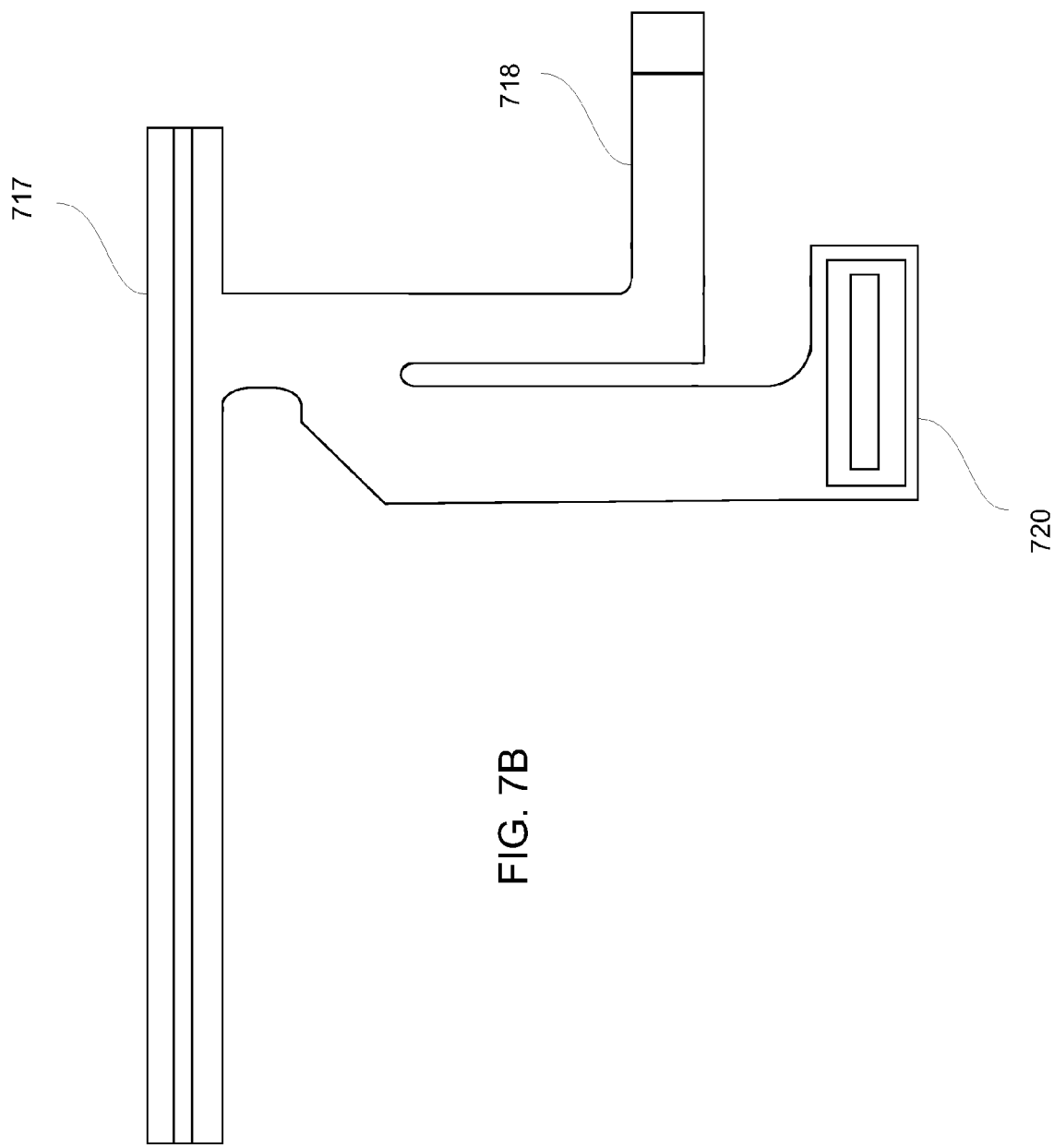

FIGS. 7A-7B are various views of the flex circuit shown in FIG. 6. As shown in perspective view in FIG. 7A, the flex circuit may be folded between top extremity 717 and bottom extremity 718 of the flex circuit for electrically coupling the top and bottom extremities to the top and bottom surface coupling sites of the thin touch sensor panel. Distal extremity 720 may include a connector for coupling signals from the thin touch sensor panel to electronics of the portable electronic device.

As shown in top view of in FIG. 7B, the flex circuit can have top extremity 717, bottom extremity 718 and distal extremity 720. Top extremity 717 may be substantially T shaped, however bottom extremity 718 may be non-T shaped. In particular, bottom extremity 718 may be substantially L shaped.

Figure 8A:
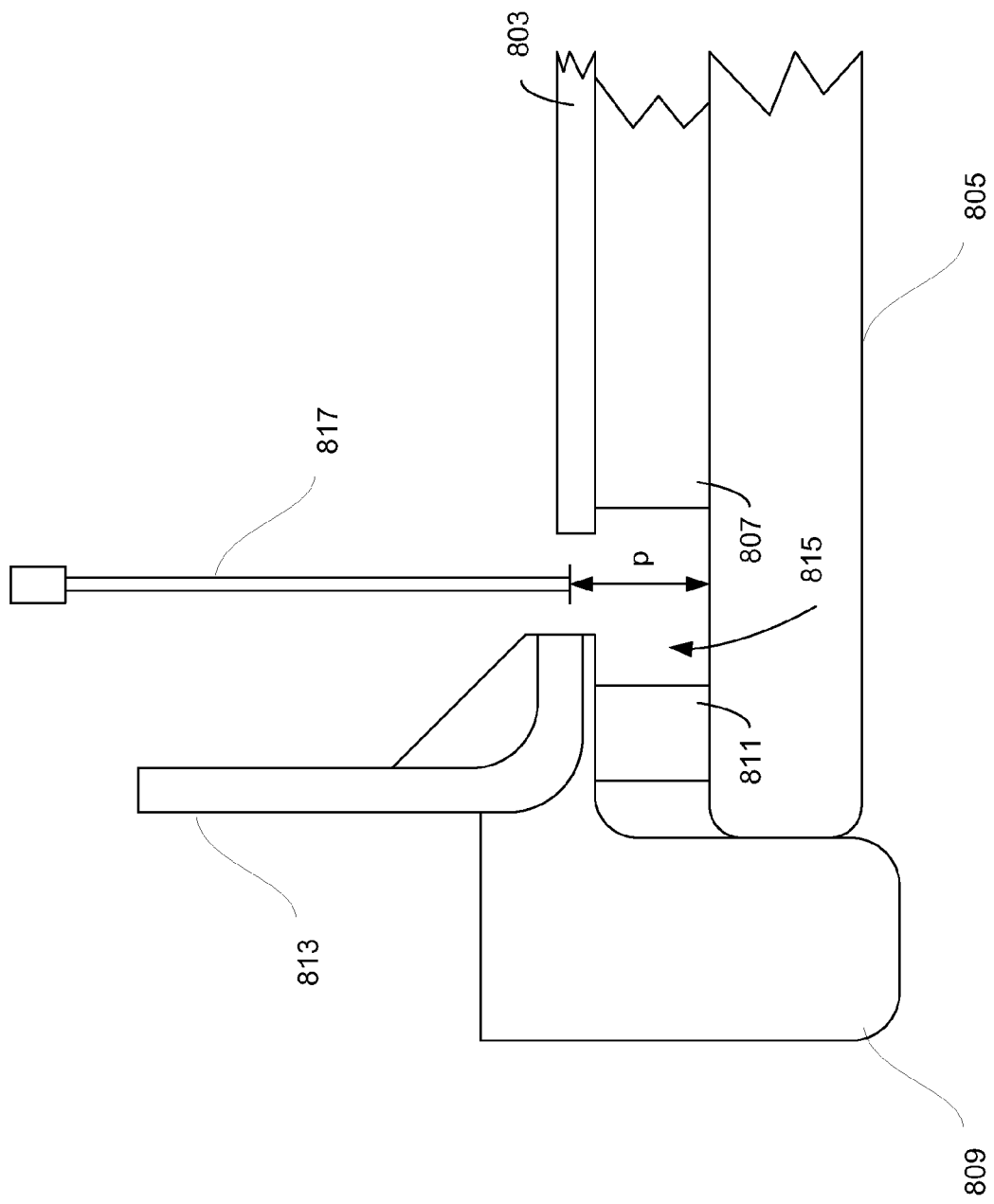
FIGS. 8A-8B are partial cross sectional views to illustrate assembly and adhesive potting.
Figure 8B:
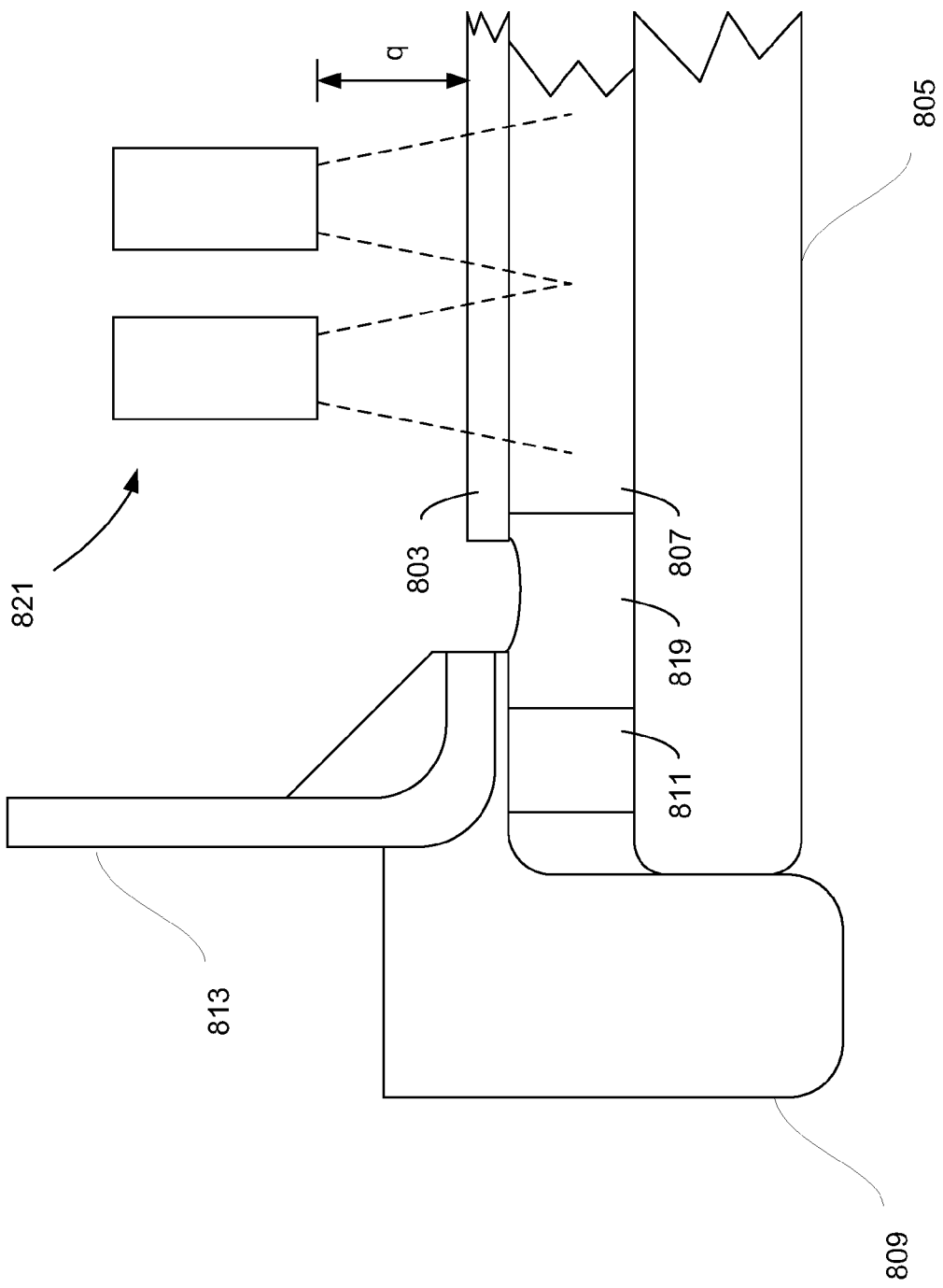

FIGS. 8A-8B are partial cross sectional views to illustrate assembly and adhesive potting. As shown in FIG. 8A, a first major surface of a thin touch sensor panel 803 may be coupled to a cover glass 805 using a layer of an optically clear adhesive 807, such as 3M optically clear adhesive 8187, 8141, 8142, 9483, 8185 or 8147. The cover glass 805 may be coupled to a plastic housing 809 of the portable electronic device using a layer of a structural bonding adhesive 811, such as Loctite HF8600. A metal tab 813 may have been embedded in the plastic housing 809 when the plastic housing was formed.

As shown in FIG. 8A, there may be a void 815 between the first major surface of the touch sensor panel 803, the cover glass 805 and housing 809. The void 815 may be filled by selectively applying a potting adhesive, such as Loctite 3103 or 3106, to the void 815 in such a way as to avoid applying the potting adhesive to an opposing major surface of the touch sensor panel 803. The potting adhesive may be so applied by expelling the potting adhesive though a hollow needle 816 positioned a distance P, of about 0.25 millimeters, from the cover glass 805. The hollow needle may be about 11 millimeters long, and may have an inner diameter of about 0.15 millimeters and an outer diameter of about 0.3 millimeters.

FIG. 8B shows the potting adhesive 819 selectively applied in such a way as to avoid applying the potting adhesive to the opposing major surface of the touch sensor panel 803. As shown in FIG. 8B, one or more lights 821 may be arranged adjacent to the touch sensor panel 803 at a sufficient intensity and at a sufficient proximity for curing the potting adhesive. Such proximate arrangement of the lights 821 may be at a distance, q, of about 1.5 centimeters. As such distance, light intensity may be about 2000 to 2300 milliwatts per square centimeter. Such light may be ultraviolet light having peak wavelength at about 365 nanometers.

Figure 9:
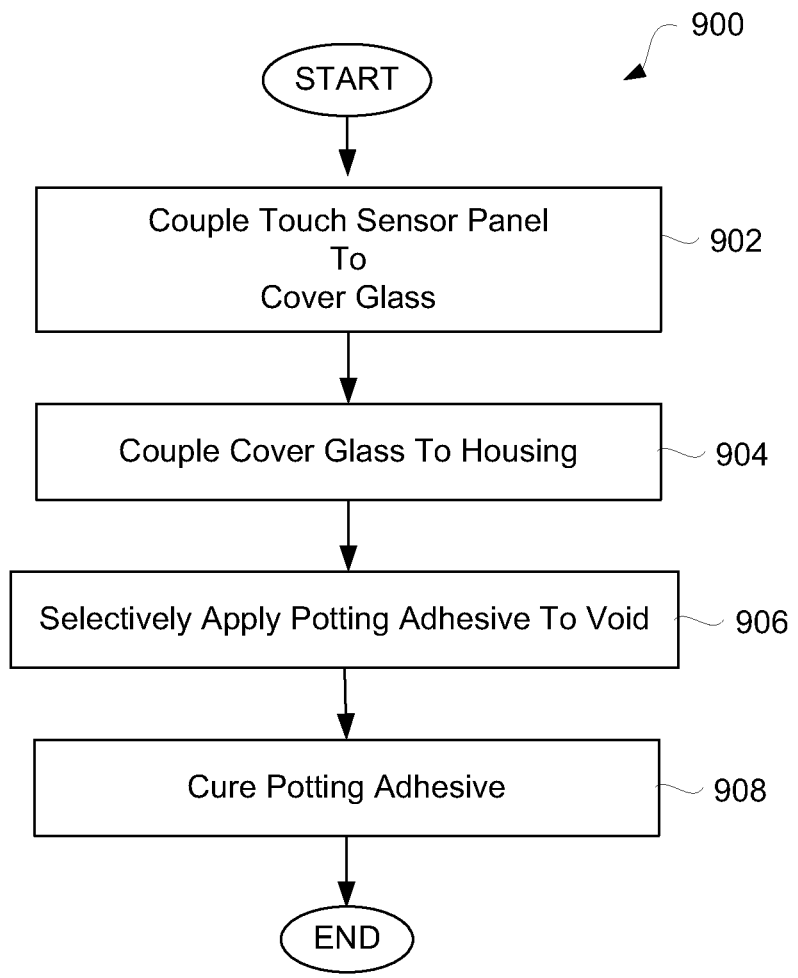
FIG. 9 is a flow chart to illustrate a process of assembly.

FIG. 9 is a flow chart to illustrate a process of assembly. Such process 900 may begin with coupling 902 the first major surface of the thin touch sensor panel to the cover glass. The process 900 may continue with coupling 904 the cover glass to the housing of the portable electronic device. The process 900 may continue with selectively applying 906 the potting adhesive to the void between the first major surface of the touch sensor panel, the cover glass and the housing in such a way as to avoid applying the potting adhesive to an opposing major surface of the touch sensor panel. The process 900 may continue and with applying light adjacent to the touch sensor panel at a sufficient intensity and at a sufficient proximity for curing 908 the potting adhesive. Once the potting adhesive is cured 908, the process 900 can end.

Figure 10A:
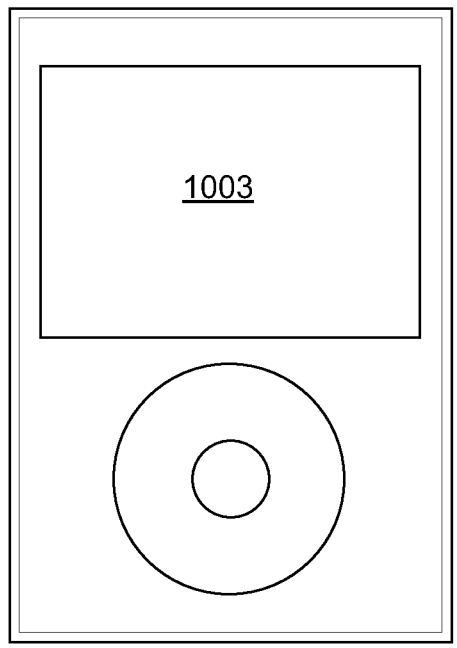
FIGS. 10A and 10B are simplified views of portable electronic devices incorporating thin touch panels.
Figure 10B:
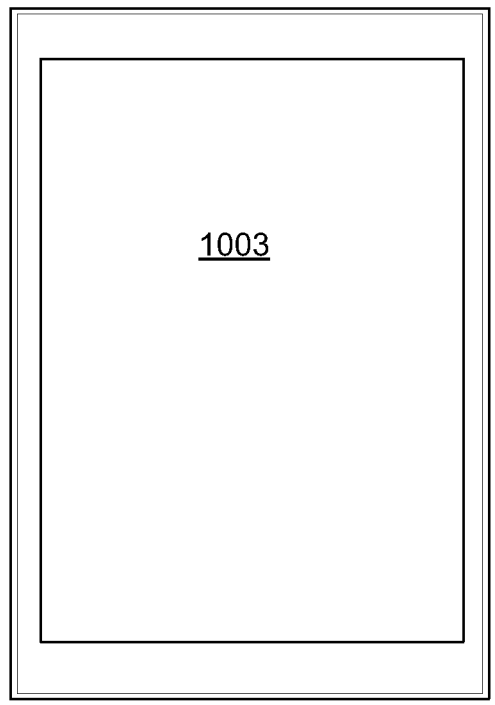

FIGS. 10A and 10B are simplified views of portable electronic devices incorporating the thin touch panels. As discussed previously herein, the thin touch sensor panel 1003 may comprise the glass substrate having the thickness of substantially less than approximately one half millimeter, and the first patterned thin film coupled to the first major surface of the glass substrate. The thin touch sensor panels can be substantially optically transparent, so that a display can be visible through the thin touch sensor panel, if the thin touch sensor panel is arranged over the display in the portable electronic device.

FIG. 10A illustrates an exemplary digital media player 1001, which can incorporate the thin touch sensor panel 1003. FIG. 10B illustrates an exemplary mobile telephone, which likewise can incorporate the thin touch sensor panel 1003. The thin touch panel can be incorporated into the portable electronic device in a computerized implementation.

Figure 11:
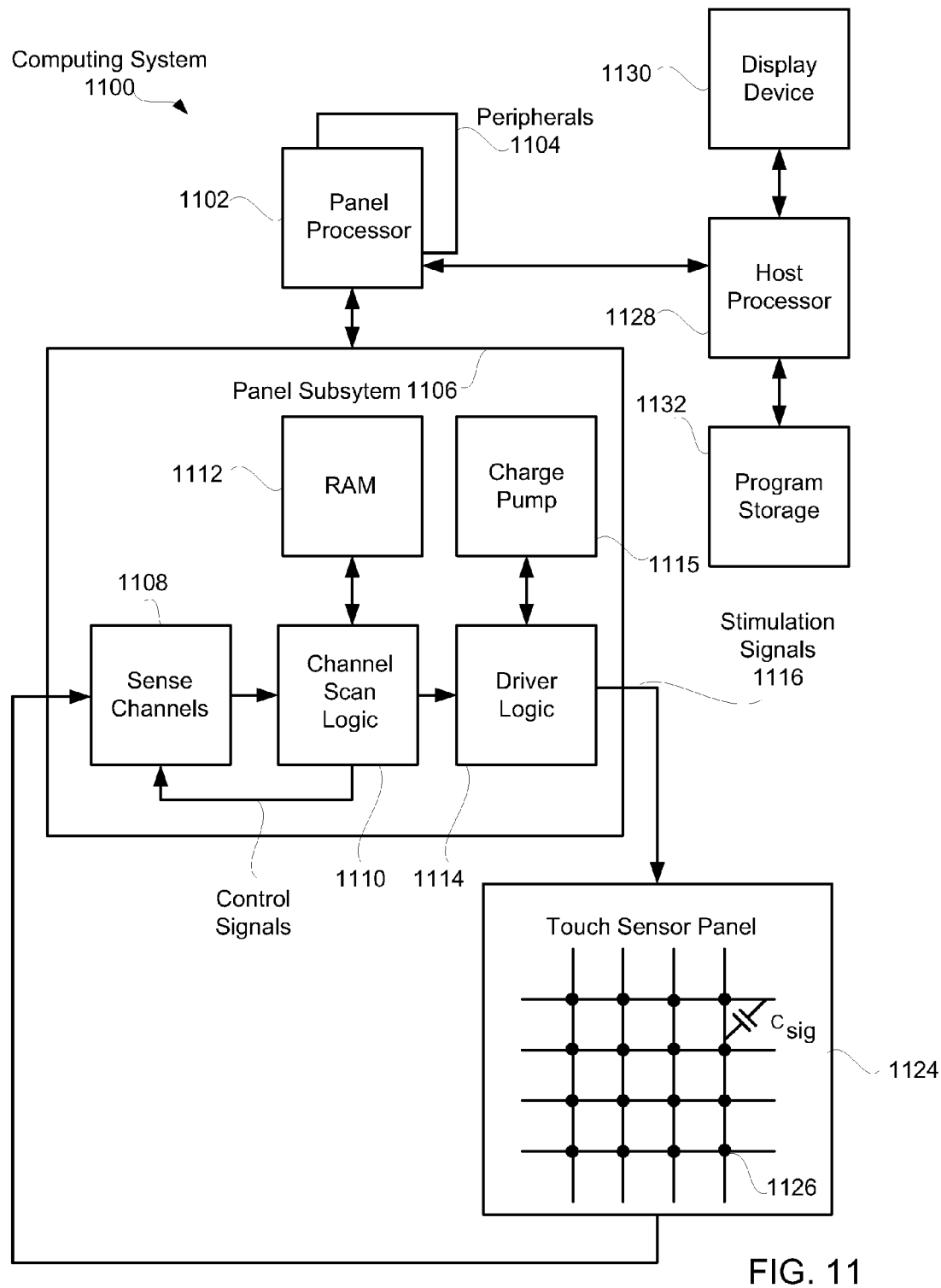
FIG. 11 is a block diagram illustrating computerized implementation of a thin touch panel incorporated into a portable electronic device.

FIG. 11 is a block diagram illustrating computerized implementation of the thin touch panel incorporated into the portable electronic device. Computing system 1100 can include one or more panel processors 1102 and peripherals 1104, and panel subsystem 1106. Peripherals 1104 can include, but are not limited to, random access memory (RAM) or other types of memory or storage, watchdog timers and the like. Panel subsystem 1106 can include, but is not limited to, one or more sense channels 1108, channel scan logic 1110 and driver logic 1114.

Channel scan logic 1110 can access RAM 1112, autonomously read data from the sense channels and provide control for the sense channels. In addition, channel scan logic 1110 can control driver logic 1114 to generate stimulation signals 1116 at various frequencies and phases that can be selectively applied to drive lines of touch sensor panel 1124. Charge pump 1115 can be used to generate stimulation signals 1116 that can have voltage amplitudes higher than digital logic level supply voltages. Although FIG. 11 shows charge pump 1115 separate from driver logic 1114, the charge pump can be part of the driver logic. In some embodiments, panel subsystem 1106, panel processor 1102 and peripherals 1104 can be integrated into a single application specific integrated circuit (ASIC).

Thin touch sensor panel 1124 can include a capacitive sensing medium having a plurality of drive lines and a plurality of sense lines, although other sensing media can also be used. Either or both of the drive and sense lines can be coupled to the thin mother glass sheet. Each intersection of drive and sense lines can represent a capacitive sensing node and can be viewed as picture element (pixel) 1126, which can be particularly useful when touch sensor panel 1124 is viewed as capturing an "image" of touch. (In other words, after panel subsystem 1106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel)). Each sense line of touch sensor panel 1124 can drive sense channel 1108 (also referred to herein as an event detection and demodulation circuit) in panel subsystem 1106. The capacitance between row and column electrodes may appear as a mutual capacitance Csig when the given row is stimulated with an AC signal.

Computing system 1100 can also include host processor 1128 for receiving outputs from panel processor 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1128 can also perform additional functions that may not be related to panel processing, and can be coupled to program storage 1132 and display device 1130 such as an LCD panel for providing a user interface to a user of the device. Display device 1130 together with touch sensor panel 1124, when located partially or entirely under the touch sensor panel, can form touch screen 1118.

Additional details on fabrication thin sheet can be found in: (i) U.S. Patent Publication No. 2009/0324939 A1, which is hereby incorporated herein by reference; and (ii) U.S. Patent Publication No. 2009/0324899 A1, which is hereby incorporated herein by reference.

The advantages of the invention are numerous. Different aspects, embodiments or implementations may yield one or more of the following advantages. One advantage of the invention is that it can help to satisfy consumer demand for making portable electronic devices thinner, by providing a thin touch sensor panel for incorporation into such portable electronic devices. Other advantages of the invention are: compactly coupling the thin touch sensor panel to electronics of the portable electronic device; and securely holding the thin touch sensor panel (while being selective in application of potting adhesive).

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An apparatus formed from a mother glass substrate, comprising:
   a touch sensor panel comprising a chemically strengthened glass substrate having a thickness of substantially less than approximately one half millimeter, and a first patterned electrode thin film coupled to a first major surface of the glass substrate;
   wherein the touch sensor panel is singulated from the mother glass substrate subsequent to both chemically strengthening and coupling of the first patterned electrode thin film to the first major surface of the glass substrate;
   wherein the glass substrate of the touch sensor panel has a second major surface opposing the first major surface; and
   wherein the touch sensor panel further comprises first and second surface coupling sites, wherein the first surface coupling site comprises a first set of substantially uniformly spaced apart conductors coupled with the first major surface of the glass substrate, and wherein the second surface coupling site comprises a second set of substantially uniformly spaced apart conductors disposed on the second major surface of the glass substrate.

2. An apparatus as in claim 1 wherein the thickness of the glass substrate is less than about 0.4 millimeter.

3. An apparatus as in claim 1 wherein the thickness of the glass substrate is approximately 0.33 millimeter.

4. An apparatus as in claim 1 wherein the thickness of the glass substrate is approximately 0.3 millimeter.

5. An apparatus as in claim 1 wherein the chemically strengthened glass substrate has sufficiently high compressive surface stress and depth of compressive layer, so as to provide for substantial strengthening of the glass substrate.

6. An apparatus as in claim 1 wherein the chemically strengthened glass substrate has a compressive surface stress substantially greater than approximately three hundred and ninety MegaPascals.

7. An apparatus as in claim 1 wherein the chemically strengthened glass substrate has a depth of compressive layer substantially greater than approximately 7.2 micrometers.

8. An apparatus as in claim 1 wherein the chemically strengthened glass substrate has sufficiently low compressive surface stress and depth of compressive of compressive layer, so as to provide for substantial laser scribing of the glass substrate.

9. An apparatus as in claim 1 wherein the chemically strengthened glass substrate has a compressive surface stress substantially less than approximately five hundred and fifty MegaPascals.

10. An apparatus as in claim 1 wherein the chemically strengthened glass substrate has a depth of compressive layer substantially less than approximately 8.5 micrometers.

11. An apparatus as in claim 1 wherein the chemically strengthened glass substrate has a compressive surface stress substantially within a range from approximately four hundred and fifty MegaPascals to approximately five hundred and fifty MegaPascals.

12. An apparatus as in claim 1 wherein the chemically strengthened glass substrate has a depth of compressive layer substantially within a range from approximately 7.75 micrometers to approximately 8.5 micrometers.

13. An apparatus as recited in claim 1 wherein:
the glass substrate of the touch sensor panel has a same end portion; and
and wherein the first and second surface coupling sites are both proximate to the same end portion of the glass substrate.

14. An apparatus as recited in claim 13 wherein the first and second surface coupling sites are arranged opposing each other.

15. An apparatus as recited in claim 13 wherein the first and second surface coupling sites are arranged substantially overlapping each other.

16. An apparatus as recited in claim 13 wherein the first and second surface coupling sites are separated from each other by the thickness of substantially less than approximately one half millimeter of the glass substrate.

17. A portable electronic device, comprising:
a thin touch sensor panel including at least (i) a chemically strengthened glass substrate having a thickness of substantially less than approximately one half millimeter, and (ii) a first patterned electrode thin film coupled to a first major surface of the glass substrate,
wherein the thin touch sensor panel is singulated from a mother glass substrate subsequent to both chemically strengthening of the glass substrate and coupling of the first patterned electrode thin film to the first major surface of the glass substrate,
wherein the glass substrate of the thin touch sensor panel has a second major surface opposing the first major surface, and
wherein the thin touch sensor panel further comprises first and second surface coupling sites, wherein the first surface coupling site comprises a first set of substantially uniformly spaced apart conductors coupled with the first major surface of the glass substrate, and wherein the second surface coupling site comprises a second set of substantially uniformly spaced apart conductors disposed on the second major surface of the glass substrate.

18. A portable electronic device as in claim 17 wherein the portable electronic device comprises a mobile telephone.

19. A portable electronic device as in claim 17 wherein the portable electronic device comprises a digital media player.

20. An apparatus comprising:
a thin mother glass sheet having a plurality of touch sensor panels arranged thereon, each of the plurality of sensor panels laser scribed on the thin mother glass sheet to not be sawed entirely through the thin mother glass sheet, each of the plurality of a touch sensor panels having opposing first and second major surfaces, and further having a same end portion; and
first and second surface coupling sites of the touch sensor panel, wherein the first surface coupling site comprises a first set of substantially uniformly spaced apart conductors disposed on the first major surface of the touch sensor panel, wherein the second surface coupling site comprises a second set of substantially uniformly spaced apart conductors disposed on the second major surface of the touch sensor panel, and wherein the first and second surface coupling sites are both proximate to the same end portion of the touch sensor panel, and wherein the touch sensor panel includes a chemically strengthened glass substrate and has a thickness of less than one half millimeter.

21. An apparatus as recited in claim 20 further comprising a flex circuit having first, second and distal extremities, wherein the flex circuit is folded between the first and second extremities, wherein the first extremity of the flex circuit is electrically coupled with the first surface coupling site of the touch sensor panel, and wherein the second extremity of the flex circuit is electrically coupled with the second surface coupling site of the touch sensor panel.

22. An apparatus as recited in claim 21 wherein the first extremity of the flex circuit is substantially T shaped.

23. An apparatus as recited in claim 21 wherein the second extremity of the flex circuit is non-T shaped.

24. An apparatus comprising:
a thin mother glass sheet having chemically strengthened surfaces and a plurality of touch sensor panels arranged in the thin mother glass sheet, the touch sensor panels laser scribed on the thin mother glass sheet to not be sawed entirely through the thin mother glass sheet;
a patterned electrode thin film coupled to a first major surface of each of the plurality of touch sensor panels,
wherein each of the plurality of touch sensor panels are singulated from the thin mother glass sheet after the patterned electrode thin film is coupled to teach of the plurality of touch sensor panels, and
wherein each of the plurality of touch sensor panels have a thickness of less than one half millimeter,
wherein each of the touch sensor panels has a second major surface opposing the first major surface, and
wherein each of the touch sensor panels further comprises first and second surface coupling sites, wherein the first surface coupling site comprises a first set of substantially uniformly spaced apart conductors coupled with the first major surface, and wherein the second surface coupling site comprises a second set of substantially uniformly spaced apart conductors disposed on the second major surface.

* * * * *